March 17, 1970     A. F. BURTON     3,501,197

SEAT SUPPORT

Filed June 20, 1968     3 Sheets-Sheet 1

Inventor
Arnold F. Burton
By Cushman, Darby & Cushman
Attorneys

United States Patent Office 3,501,197
Patented Mar. 17, 1970

3,501,197
SEAT SUPPORT
Arnold F. Burton, 27 Kerry Crescent,
Ottawa 5, Ontario, Canada
Continuation-in-part of application Ser. No. 626,125,
Mar. 27, 1967. This application June 20, 1968, Ser.
No. 744,245
Claims priority, application Canada, Mar. 25, 1966,
955,936
Int. Cl. A47c 5/12, 5/14
U.S. Cl. 297—232         4 Claims

ABSTRACT OF THE DISCLOSURE

A portable seat and back support panel for chairs, automobiles and the like. The seat and back portion are generally planar and are interconnected by an intermediate curved portion which provides support for the ischial tuberosities, gluteal area and inferior pad of muscles of a user. Therefore, the lower back of the user is prevented from becoming pinched between the back and seat cushions of a main suppporting surface. The panel is preferably manufactured from a mouldable material and is of sufficient thickness to support a user without flexing appreciably.

---

Figure 1:
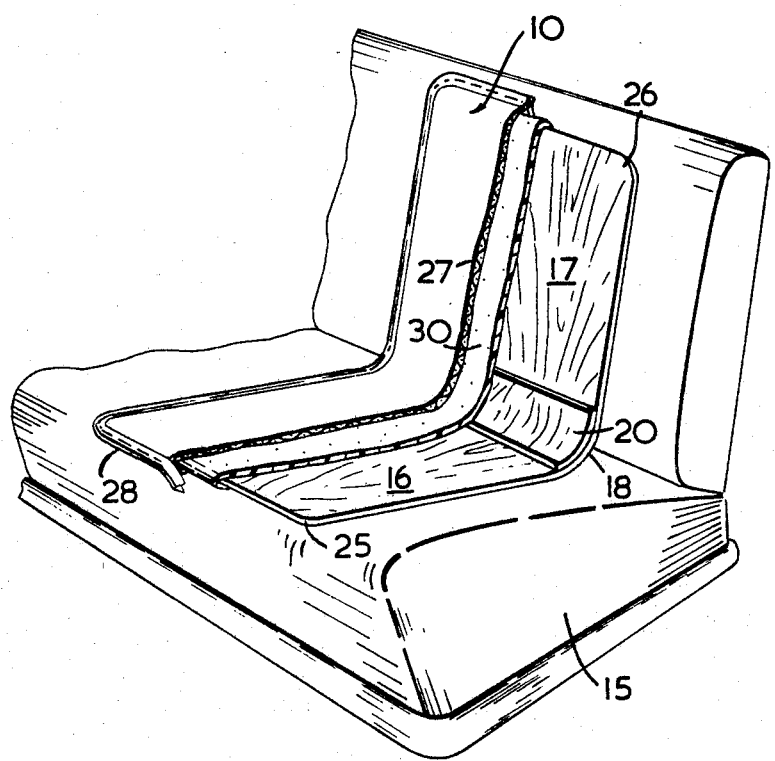

This invention relates to portable combination seat and back panels for use supporting surfaces such as home or office chairs, automobile and truck seats. This application is a continuation-in-part of application 626,125, filed Mar. 27, 1967, now abandoned.

Known portable panels of the foldable, ventilated variety are useful in providing cool support to a person using a seat of leather, plastic or other non-breathing surface. However, these known panels contribute little to the actual anatomical structure of the user and in particular to the region of the ischial tuberosities, gluteal area and the inferior pad of muscles or, in lay language, the lower back.

Normal chair seating and especially automobile travel is often uncomfortable for people having back disorders whether the source thereof is spinal or muscular. A large portion of this discomfort can be credited to the independent movement of the cushion and back portions respectively of a chair, Chesterfield or automobile seat when, for example, a vehicle passes over bumps or waves in the road. The seat cushion moves vertically with a person's weight while the back section remains motionless causing friction between the person's back and the seat back. Furthermore, repeated movement of this sort tends to effect a pinching action on the lower back because this portion of the anatomy is mover deeper into the split between the seat cushions during each vertical movement of the vehicle. Of course, this frictional and pinching action between the seat and the seated person can also be experienced in an aircraft, office chair, Chesterfield or any supporting media where there is relative movement between back and seat portions or where the joined area of the back and cushion portions create a cavity which the ischial tuberosities may enter.

The present invention provides a portable and comfortable seat and back panel which provides lasting support for the lower back region when used on the abovementioned surfaces; it is light and easy to carry and, in automobiles, gives the required support in the spinal and lower back region during vertical movement of the vehicle to prevent the described pinching and friction to the seated person. In effect, the entire seat moves with the person's body.

According to one aspect, the present invention provides a portable combination seat and back panel for use by a person for orthopedic purposes, the combination seat and back panel comprising seat supporting and back supporting portions and an intermediate curved portion adapted to support the lower back of said person, the curved portion joins the seat and back portions so that those portions are substantially rigidly interconnected when in use; the curved joining portion defining an angle of not less than approximately 90°. The back and seat portions are generally planar and of a thickness sufficient to support a person seated thereon without appreciable flexure.

Figure 2:
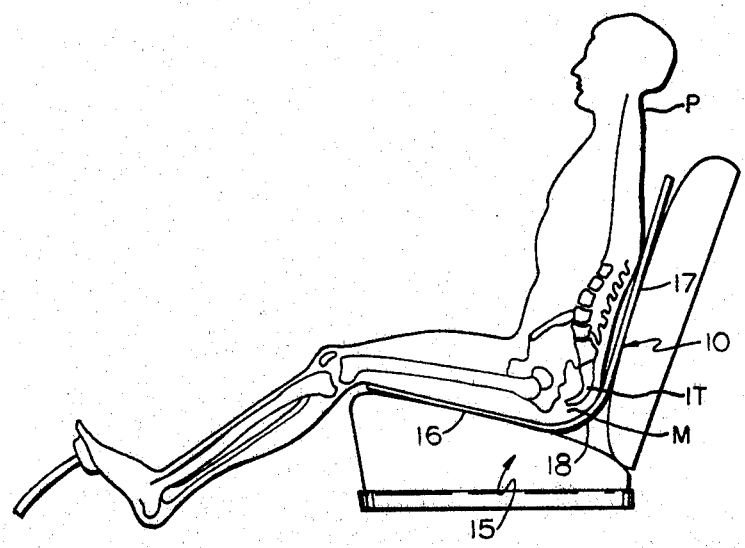
Figure 3:
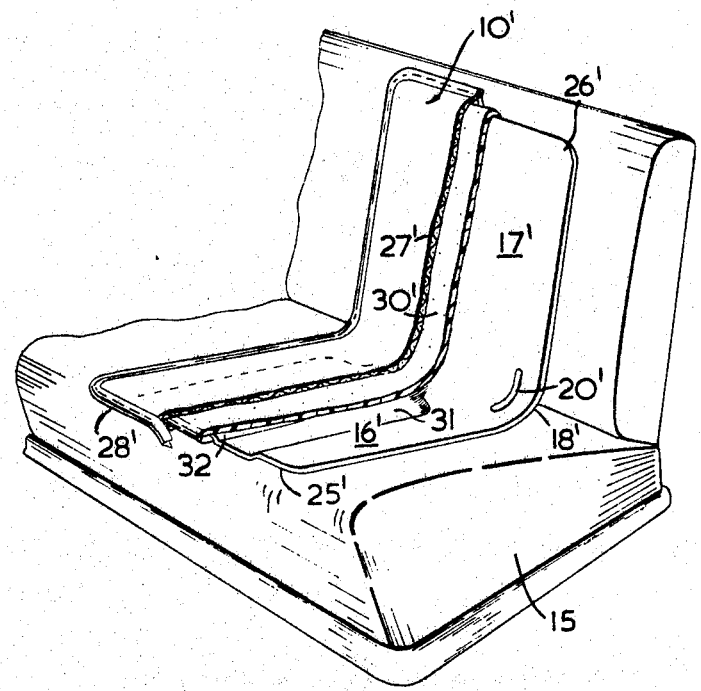

The invention is illustrated, by way of example in the accompanying drawings in which:

FIGURE 1 is a perspective view of the combination seat and a suitable cover in use, partly broken away to show details of construction, and FIGURE 2 is a side elevational view of the seat of FIGURE 1 showing a person seated thereon; and FIGURE 3 is a perspective view of an alternative construction of the seat.

Referring now in detail to the drawings, a portable combination seat and back panel is shown generally at 10 in FIGURES 1 and 2 in use on a conventional automobile seat 15.

The combination seat and back panel 10 comprises a seat portion 16 and a back rest portion 17 integrally joined together by a curved intermediate portion 18. As shown by the spinal structure of the person P, the curved portion 18 supports the ischial tuberosities IT, and the inferior pad of muscles M, generally known as the lower back.

The seat 16 and back 17 are preferably formed of a single rectangular piece of relatively thin material (such as plywood in FIG. 1 or moulded material in FIGS. 2 and and 3), bent or formed to the desired shape. In the plywood embodiment, this can be acomplished by bending the plywood over a cylindrical object. It has also been found that three-ply plywood approximately ⁹⁄₁₆ inch in thickness is satisfactory for this purpose. A suitable mouldable material is ABS (trademark), a high impact thermoplastic sheet. Moulded glass fiber compositions are highly satisfactory.

The back and seat portion in an unstressed state are normally arranged in the order of a right angle, i.e. roughly not less than 90°. This angle may be maintained in one embodiment by a thin ply of wood 20 as shown in FIGURE 1. The thin ply of wood 20 preferably extends along the entire concave side of the curved portion 18 and extends for some distance on both sides of the curved portion. A suitable adhesive bonds the thin ply 20 to the upper surface of the plywood. It will also be appreciated that in this example the grain of the plywood 20 is disposed transverse to the longitudinal axis of the curved portion 18. This provides an area of increased rigidity immediately adjacent the curved portion 18 thus reducing flexure longitudinally while transverse flexure is prevented by the curved portion 18, the latter thereby having sufficient flexibility to compensate for any predetermined changes in the angular relationship between portions 16 and 17. This flexibility is also pronounced in embodiments using a single sheet of the high impact thermoplastic such as those of FIGS. 2 and 3.

Portions 16 and 17 are flexible adjacent their free end edges. This is not undesirable as it is only the portions of the seat and back contacted by the buttocks and lower back of the person that are required to be rigid.

The corners of the seat 16 and back 17 are preferably rounded at 25 and 26 respectively and if desired a fabric covering 27 may be provided. The fabric covering shown more clearly in FIGURE 1 is applied on both sides of the combination seat and back rest 10 and the outer edges of the fabric are stitched together and to a binding 28. A suitable pad 30 of foam rubber or the like may be placed between the covering 27 and the seat portion 16 and back portion 17. Alternatively, a perforated plastic sheet (not shown) may be adhesively secured to the panel in place of the foam rubber.

As previously discussed, the curved portion 18 is important to the comfort of the user in most instances because upholstered furniture, automobile seats and the like usually have some form of separation between the seat and back portions so that little if any support is provided at this area. The curved portion 18 thus provides additional support at the intersection of the seat 16 and back 17 as well as providing substantial rigid interconnection therebetween.

It will be noted with reference to FIGURE 2 that a person seated on the combination seat 10 will assume much the same position as if seated in a straight back chair. It has been found that relief is obtained from backache due to such disorders as degenerative discs or irritation of the sciatic nerves. The seat 10 when used in an automobile will provide support when the vehicle goes over bumps as the entire seat 10 moves with the person's body rather than allowing portions of the body to move independently due to the resiliency of the seat suspension.

Alternatively, the combination seat and back rest may be constructed as indicated generally at 10' in FIG. 3. A seat portion 16' and back portion 17' are integrally joined together by a curved portion 18', the seat 16' and back 17' preferably being formed of a single rectangular sheet of thermoplastic. A curved portion 18' maintains its required curvature with the assistance of a pair of ribs 20' (only one of which is shown).

The corners of the seat 10' are rounded at 25' and 26' and a fabric covering 27' including a binding 28' is provided. A suitable pad 30' preferably of foam rubber or the like is used under the covering 27'.

The seat portion 16' is provided with a dished portion 31 which flows smoothly into the curved portion 18'. A further rib 32 is preferably formed in the dished portion 31 to increase the stiffness.

The combination seat and back 10' is particularly advantageous in automobiles where head room is restricted as the dished portion 31 allows the seat 10' to sink into the automobile seat 15 to some extent.

Although the combination seats 10 and 10' described and illustrated herein are fabricated of wood or plastic, other suitable materials or combinations of materials such as plastics and metals may be used. Furthermore, this invention is not restricted to use in conjunction with an automobile seat as it has been found to be useful on Chesterfields, swivel chairs or the like to improve posture and relieve backache.

A suitable material for use in forming the seat 10' of FIG. 3 is an ABS high impact thermoplastic sheet sold under the trademark Royalite by the United States Rubber Company.

I claim:

1. A portable combination seat and back panel for use by a person for orthopedic purposes, said combination seat and back panel comprising seat supporting and back supporting portions and an intermediate curved portion adapted to support the ischial tuberosities or lower back of said person, said curved portion extending the width of the panel and defining a segment of a cylinder and joining the seat and back portions so that those portions are substantially rigidly interconnected when in use; the curved joining portion defining an angle of not less than approximately 90° and having sufficient flexibility to compensate for any changes in the angular relationship of the seat and back portions; said back and seat portions being generally planar and of a thickness sufficient to support a person seated thereon without appreciable flexure.

2. A portable combination seat and back panel for use on an automobile seat, said seat panel comprising a substantially rectangular member of moulded material having a length greater than its width and having a bend adjacent the mid portion of its length extending the width of said panel, said bend defining a segment of a cylinder whereby the back and seat portions joined by said bend enclose an angle of not less than approximately 90°; said bend being adapted to support the ischial tuberosities of a user; said back and seat portions being generally planar in configuration and of a thickness sufficient to support the person seated thereon without appreciable flexure.

3. A portable combination seat and back panel for use on an automobile seat comprising a substantially rectangular panel having a length greater than its width and having a bend adjacent the mid portion of its length, said bend extending the width of said panel and defining a segment of a cylinder; said bend being substantially rigid and adapted to support the ischial tuberosities, gluteal area and inferior pad of muscles of a user and defining a segment of a cylinder whereby the back and seat portions integrally joined by said bend enclose an angle of not less than approximately 90°, said back and seat portions being generally planar in configuration and of a thickness sufficient to support the person seated thereon without appreciable flexure.

4. A portable seat panel for personal use on supporting surfaces such as chairs, Chesterfields and automobile seats, said panel being more rigid than the supporting surfaces and comprising
 (a) a seat supporting portion;
 (b) a back supporting portion normally arranged in the order of a right angle to the seat supporting portion; and
 (c) a curved portion intermediate of and connecting the back and seat portions and adapted to support the ischial tuberosities of a person, the curved portion defining a segment of a cylinder throughout the width of the panel;
 (d) said curved intermediate portion having sufficient flexibility to compensate for any changes in the angular relationship of said seat and back supporting portions;
 (e) the back and seat portions being generally planar and of a thickness sufficient to support a person without appreciable flexure.

References Cited

UNITED STATES PATENTS

| 271,757 | 2/1883 | Woodman | 297—457 X |
| 2,007,075 | 7/1935 | Clements | 297—253 |
| 2,581,888 | 1/1952 | Schlegel et al. | 297—253 |
| 2,808,875 | 10/1957 | Bargen | 297—457 |
| 3,138,404 | 6/1964 | Newton | 297—232 |

FOREIGN PATENTS

| 810,950 | 3/1959 | Great Britain. |

JAMES T. McCALL, Primary Examiner

U.S. Cl. X.R.

297—231, 457